United States Patent [19]
Joseph

[11] 3,778,830
[45] Dec. 11, 1973

[54] VIBRATION COMPENSATION FOR RANGE DIRECTION FINDER
[75] Inventor: Horace M. Joseph, China Lake, Calif.
[73] Assignee: The United States of America as represented by the Secretary of the Navy, Washington, D.C.
[22] Filed: Aug. 24, 1972
[21] Appl. No.: 283,449

[52] U.S. Cl. ............... 343/17.7, 343/16 R, 343/114
[51] Int. Cl. ........................... G01s 3/10, G01s 9/02
[58] Field of Search .................. 343/16 R, 114, 17.7

[56] References Cited
UNITED STATES PATENTS
| | | | |
|---|---|---|---|
| 3,221,328 | 11/1965 | Isch ............................... | 343/17.7 X |
| 3,025,517 | 3/1962 | Watson et al. ..................... | 343/16 R |
| 3,495,249 | 2/1970 | Downie .......................... | 343/16 R X |
| 3,482,246 | 12/1969 | Cox ................................ | 343/114 X |

Primary Examiner—Malcolm F. Hubler
Attorney—R. S. Sciascia et al.

[57] ABSTRACT

Apparatus for compensating signal direction of arrival measurements used for direction finding and ranging for phase errors generated by changes in the relative positions of receiving antennas due to vibration or structural weaving. The apparatus can be used to advantage in monopulse radar systems wherein the relative phase between the signals induced in separated antennas is used to deduce target position. Local oscillator power and, when required, auxiliary signals are electromagnetically coupled to at least two identical receivers over portions of incoming signal path to produce a unique error signal. Auxiliary signals are coupled if vibrations are not symmetrical or are not sufficiently in synchronism. The auxiliary signals are coupled during "quiet" intervals when no received signals are present to provide reference signals over the same portions of incoming signal path.

4 Claims, 2 Drawing Figures

PATENTED DEC 11 1973 3,778,830

VIBRATION COMPENSATION FOR RANGE DIRECTION FINDER

BACKGROUND OF THE INVENTION

In direction finding by use of phasor quantities and in ranging by use of signal time-of-arrival differences, it is desirable to have maximum resolution at all times. This can be achieved primarily by providing maximum separation between individual elements; however for aircraft and ships, separation is confined to a few wavelengths by considerations of errors induced by antenna element separation and by changes in transmission line parameters created by structural weaving rather than by vehicle extent.

Compensation is especially important when short duration signals require that monopulse methods or time measurements be used since they use relative phase or time difference between signals induced in separated antennas to deduce emitter direction angles. Although the quantities are different, they are closely related to each other in a mathematical sense.

Continuous ranges can be obtained from a phase change rate which is also used to measure bearing and range and which are related as follows:

$$R = V \sin \theta / d\theta/dt$$

where
- $R$ = range, i.e., distance from stationary transmitter to moving receiver
- $V$ = velocity (constant) of receiving vehicle,
- $\theta$ = angle between range radius vector and velocity vector For separated antennas the time rate of change of the electrical phase angle-phasor difference, $\phi$, between antennas is given by the following equation:

$$d\phi/dt = d/dt \, (2\pi l/\lambda \cos \theta) = 2\pi/\lambda \, (l \sin \theta \, (d\theta/dt) + \cos \theta \, (dl/dt))$$

where
- $\theta$ = angle between range radius vector and velocity vector,
- $l$ = separation distance between antennas ($l<<R$), and
- $\lambda$ = wavelength (assumed constant)

The first term on the right hand side of the equation relates phasor rate to direction angle rate of change and forms the theoretical basis of some angular rate measuring systems. The second term is a dynamic term which shows the errors resulting from changes in antenna separation occasioned by structural weaving and motion. These motions are induced by irregularities in engine component motions, variations in propellant thrust, and other randomly occurring turbulences which are obviously not predictable in magnitude. Combining the above equations and assuming $l$ is constant:

$$R = 2\pi l v/c/f \sin^2\theta/d\phi/dt$$

where
- $c$ = speed of light
- $f$ = frequency of emitted radiation.

The resulting vibration waveforms are affected by mechanical characteristics of vehicle structures as influenced by external conditions. Often a steady state situation will also exist so that there will be synchronous vibrations with other variations (including random variations) superimposed thereon.

Prior art attempted solutions include the use of costly, rigid structures and auxiliary antennas. Reference oscillators are also used to provide phase angle change information; however, phase angle must be deduced by measurement at a given frequency with subsequent careful maintenance or measurement of frequency. This can be difficult to achieve since constant phase angles are often complicated functions of phase angle, and both assume that wavelength is constant. Another disadvantage of the above approach is that resultant vibration waveforms can average to zero over intervals of time significant to the integration.

SUMMARY OF THE INVENTION

Electrical apparatus are disclosed for compensating for phasor angle or timing errors generated by structural vibration of receiving antennas. The apparatus comprises a compensation circuit in which a local oscillator and an auxiliary signal are radiated to two receiving antennas over portions of the path traveled by incoming signals to obtain maximum compensation. The local oscillator signal is radiated if coincident, zero-average, vibrational change occurs, but if the vibrations have different phase or waveforms, the auxiliary signal is also transmitted. Consequently incoming signals, local oscillator power, and auxiliary signals are coupled through the same common transmission lines or waveguides, and the common-coupled power is exposed to the same separation effects of the antennas as are the incoming signals. The local oscillator signals and auxiliary signals are coupled to the receiver without variation such that differences created thereto by path changes are used to measure variations and to allow for compensation therefor.

OBJECTS OF THE INVENTION

It is a primary object of the present invention to provide an electrical compensation system for correcting radio direction bearings and corresponding range measurements for vibration-generated, phase-angle errors.

It is a further object of the present invention to provide vibration-error compensation apparatus for direction finding and range measurements by signal time-of-arrival systems wherein a local oscillator signal and a reference signal are radiated over portions the same path as that affected by the separation of receiving antennas.

Other objects, advantages and novel features of the invention will become apparent from the following detailed description of the invention when considered in conjunction with the accompanying drawings.

DESCRIPTION OF THE PREFERRED EMBODIMENT

Figure 1:
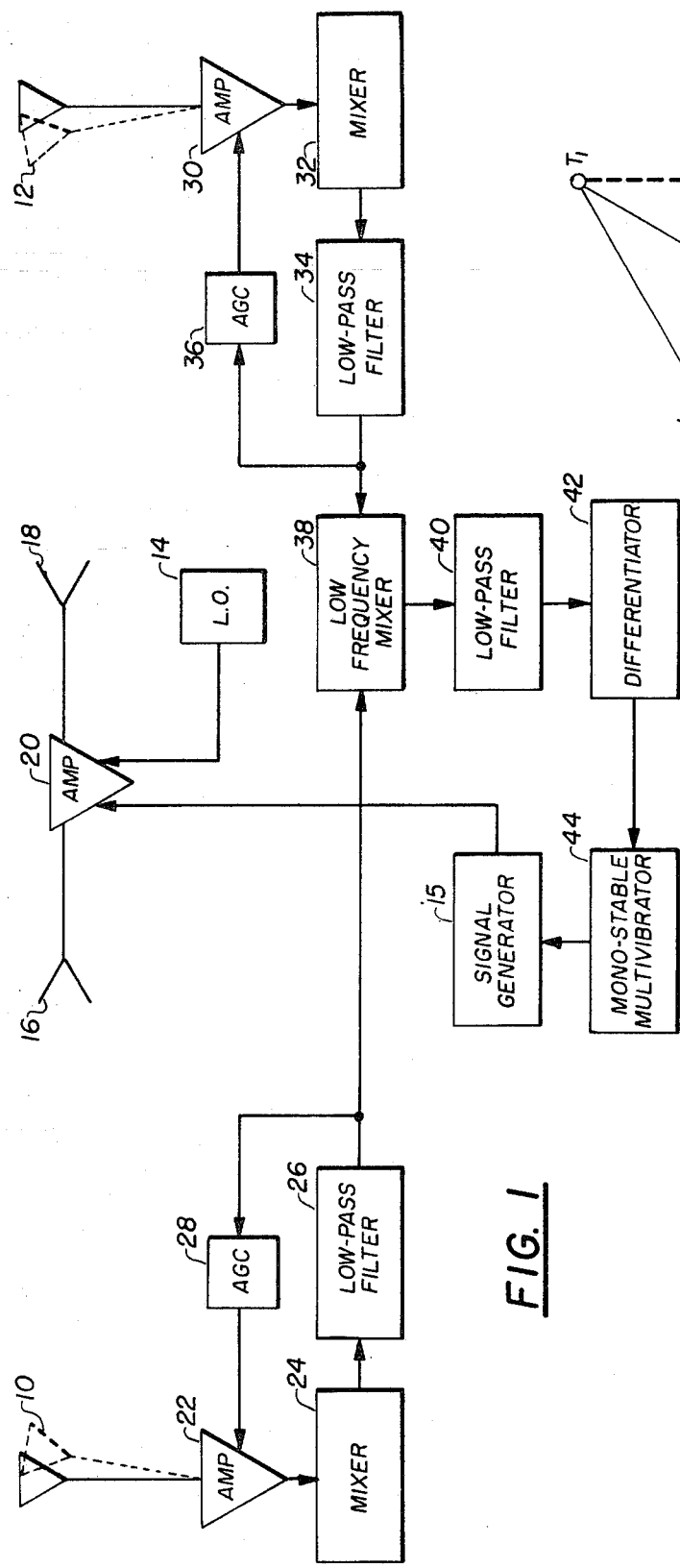
FIG. 1 is a simplified block diagram of electrical circuitry incorporating the present inventive concept.
Figure 2:
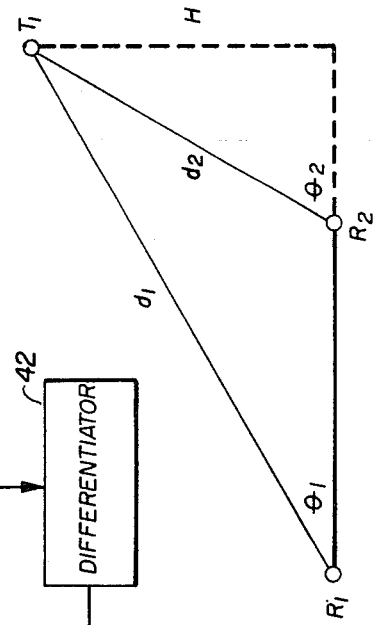
FIG. 2 is a simplified top view of the relative position of two receiver systems and a remote transmitter station.

FIG. 1 illustrates a simplified block diagram of the preferred embodiment of the present invention. For purposes of illustration it should be assumed that the antennas 10 and 12 comprise separated antennas $R_1$ and $R_2$, respectively, as shown in FIG. 2, in a monopulse receiving system wherein the relative phase of the signal induced in each antenna is used to deduce emitter source or transmitter position in a manner well-known to those skilled in the art.

The circuit shown in FIG. 1 provides electrical compensation for errors in direction finding and range measurements derived from incoming signals received by the antennas 10 and 12. The errors are caused primarily by positional or structural changes, i.e., vibration and separation effects, undergone by the antennas 10 and 12. The aforementioned compensation is achieved, in essence, by radiating energy, $E_o$, from the local oscillator 14 and reference energy from the signal generator 15 to the two antennas over portions of the same path traveled by incoming signals, $E_s$.

These two energies are radiated by the radiators 16 and 18, after amplification in the power amplifier 20, over a common, local path which comprises a portion of the same path that is affected by the separation effects of the antennas 10 and 12. The output of the antennas 10 and 12 in an operational situation thus comprises received signals from an emitter source $T_1$, a local oscillator signal, and a reference signal, all of which are exposed to the same separation effects.

The output of the antenna 10 is coupled to the amplifier 22 and then to the mixer (squarer) 24. The output of the mixer is filtered by the low-pass filter 26, and the filtered output is coupled to the AGC 28 and the low-frequency mixer 38.

The identical process occurs in the image circuitry associated with the output of the antenna 12 whereby the low-frequency mixer 38 is fed the filtered outputs from the low-pass filters 26 and 34 to produce the compensation signal to be described hereinafter.

The output of the low-frequency mixer 38 is first passed through a low-pass filter 40. The filtered output is applied to a differentiator 42 whose falling, negative slope output triggers the monostable vibrator 44. The pulsed output of the multivibrator 44 actuates the signal generator 15 to produce the aforementioned reference signal during a "quiet" interval, i.e., no incoming signals.

As stated previously, the compensation circuit of FIG. 1 utilizes local oscillator power $E_o$ coupled to the two receiving antennas 10 and 12 through the portions of the same path traveled by incoming signals $E_s$, whereby both signals are affected by the separation effects of the antennas as will be described hereinafter; during a "quiet" interval (when no emitter incoming signals are present), a reference signal is also utilized.

Assuming that the signals are sinusoidals, the following equations can be derived:

$$e_s = E_s \sin \omega_s t$$

$$e_o = E_o \sin(\omega_o t + \phi_1)$$

where
$E_s$ = max. value of received signal voltage at antenna
$\omega_s$ = signal angular frequency
$t$ = time
$E_o$ = max. value of oscillator voltage received by antenna 10
$\omega_o$ = oscillator angular frequency
$\phi_1$ = phase angle change induced by change of separation between antenna 10 and radiator 16

The output of the antenna is amplified by the amplifier 22 which has a gain, $g$, to produce, over a long term, an output which is maintained substantially constant by the AGC 28. The output of the amplifier is multiplied in the mixer or square-law detector 24 which has a conversion gain of K so that its output is euqal to:

$$e_{24} = K[g(e_s+e_o)]^2 = g^2KE_sE_o[\cos[(\omega_s-\omega_o)t-\phi_1]-\cos[(\omega_s+\omega_o)t+\phi_1]] + \text{double frequency terms} + \text{d.c. terms}$$

When the output of the square-law detector 24 is passed through the low-pass filter 26, the filtered output, exclusive of d.c. terms, is equal to the following:

$$e_{26} = g^2KE_sE_o \cos[(\omega_s-\omega_o)t-\phi_1]$$

The incoming signals received at the antenna 12 are substantially equal in amplitude to those received at the antenna 10; thus the output of the antenna 12 can be represented as follows:

$$e_s = E_s \sin(\omega_s t + \phi_s)$$

where $\phi_s$ is the signal phase angle relative to that in the antenna 10.

The corresponding output of the low-pass filter 34, after amplification in the amplifier 30 and self-multiplication in the square-law detector 32, is equal to:

$$e_{34} = g^2KE_sE_o \cos[(\omega_s-\omega_o)t-(\phi_2+\phi_2)]$$

where $\phi_2$ = change in phase angle between the receiving antenna 12 and the radiator 18.

The outputs from the low-pass filters 26 and 34 are mixed in the low-frequency mixer 38 and filtered by the low-pass filter 40 to produce a product voltage equal to the following:

$$e_o = (K^2g^4E_o^2E_s^2/8) \cos[\phi_s-(\phi_1-\phi_2)]$$

The above equation can be used to find the phase angle $\phi_s$ and also the time derivative, $d\phi_s/dt$, by utilizing $de_o/dt$ provided that the vibrations occasioned by the movement of the antennas 10 and 12 are equal in detail waveform or if they are symmetrical about the oscillator radiators and relatively small in magnitude so that the average difference signal, $\overline{e_o} = \cos(\phi_2-\phi_1)$, is substantially equal to zero. However if the changes are anti-symmetrical, are not symmetrical, or are not equal in waveform to a sufficient degree, it is necessary to provide an auxiliary or reference signal from the signal generator 15.

The reference signal is triggered by the falling off of the output of the filter 40 passing through the differentiator 42. The differentiator output in turn triggers the monostable vibrator 44 to thereby actuate the signal generator 15 to drive the reference signal of radian frequency $\omega$ through the same path as the oscillator.

The reference or auxiliary signal is a pulse and assumes that there is an interval of substantially zero incoming signals after reception, particularly if the transmitter is a pulsed radar device. The reference signal functions to measure the difference $(\phi_1-\phi_2)$ between the phase angles by supplying a known reference signal from the same source as the L.O. signal so that both have the same direction of arrival or timing. In effect, the difference in phase angles is substituted for the signal phase angle difference so that:

$$\phi_{sr} = \phi_2-\phi_1$$

Then $$e_o = (K^2g^4E_oE_{sr}^2/2) \cos 2(\phi_2-\phi_1)$$

From the above equation the amplitude of $E_{sr}$ can be adjusted so that it matches that of $E_s$, and $\phi_s$ can be derived in a well-known manner. The above signal measures the phase angle of vibrations and thus permits a similar measurement at lower frequencies such that the wavelength $\lambda_r = 2l$, at which condition there will be substantially no ambiguity.

A comparison can be performed by forming the ratio $\epsilon$ as follows:

$$\epsilon = \cos 2(\phi_{2r}-\phi_{1r})/\cos 2(\phi_2-\phi_1)$$

From the above ratio, using well-known techniques and the value of $\epsilon$, the value of the ratio $\lambda_r/\lambda$ can be determined.

Obviously many modifications and variations of the present invention are possible in the light of the above teachings. It is therefore to be understood that within the scope of the appended claims the invention may be practiced otherwise than as specifically described. For example, horns and waveguides may be attached to the antennas to bend the oscillator signal into the radiation reception area. Thus the antennas need not receive omni-directionally nor point at the oscillator radiators. This can be done in such a manner that there is substantially no interference with reception of incoming signals from any direction.

The reference signal may have a frequency different from the incoming signal and such would be necessary if there are no dependable quiet intervals. In this event further filtering and signal frequency or modulation characteristics separation would be needed to receive the reference signal without interfering with the incoming signal.

The reference signal may be furnished by modulating the local oscillator. For example, amplitude modulation at 100 MHz will permit the simultaneous existence of three frequencies separated by that amount. One can be used as local oscillator, another as a source of auxiliary signal sufficiently far from the input signal to prevent confusion with it but easily used to convey phase information in separate circuits tuned for this difference frequency. The other sum frequency may be filtered out.

The reference signal may also be produced by placing a reflector on each antenna so that it reflects some of the local oscillator signals back to a small receiver antenna placed below the oscillator radiators. The antenna will feed a common mixer whose output will have the form as before. In most cases, the novel compensation herein will be independent of frequency, but for very wide-band widths, high dispersion transmission lines, the deviation angle above may be frequency sensitive or otherwise not easily correctable; hence, it will be necessary to add delay by a delay line to the incoming signal to utilize a delayed version of the signal itself, as the auxiliary signal.

Compensation can be applied to sonar systems which obtain direction information by utilizing separated receivers when vibration periods are comparable or longer than sonar signal periods but since propagation times in the medium are relatively insensitive to frequency, hence simultaneous local oscillator signals are useful for compensating rapid changes. Pulses during quiet intervals can be used to ensure against the effects of such changes in receiver positions.

What is claimed is:

1. In direction finding and ranging systems wherein the relative phase between signals induced in separated, receiving antennas is used to deduce target position, receiver apparatus for compensating for phase errors generated by antenna structural vibration and weaving, and comprising:

first and second, separated, antennas for receiving incoming signals emitted by a remote source;

local oscillator means;

signal generator means;

first and second radiator means for radiating energy from said oscillator means and said signal generator means to said antennas over selectively predetermined portions of the same path traveled by said received signals;

first and second substantially identical mixer means connected to the outputs of said first and second antennas, respectively, for mixing said received signals, oscillator signals, and signal generator signals;

first and second low-pass filter means connected to the outputs of said first and second mixer means, respectively;

low-frequency mixer means connected to the outputs of said first and second mixer means for mixing said filtered outputs;

third low-pass filter means connected to the output of said low-frequency mixer means;

differentiator means connected to the output of said third low-pass filter means and being responsive to a negative slope output therefrom to produce a pulsed output; and, monostable multivibrator means connected to the output of said differentiator means and being responsive to said pulsed output to trigger said signal generator means whereby said signal generator means produces an output signal when no incoming signals are received.

2. The apparatus of claim 1 further including first and second automatic gain control means connected between the outputs of said first antenna and said first low-pass filter means, and second antenna and said second low-pass filter means, respectively.

3. The apparatus of claim 1 further including power amplifier means at the input of said first and second radiator means.

4. The apparatus of claim 1 wherein said first and second mixer means comprise square-law detectors.

* * * * *